UNITED STATES PATENT OFFICE.

ELIZA L. WHITON, OF WEST STAFFORD, CONNECTICUT.

IMPROVEMENT IN STOVE-POLISH.

Specification forming part of Letters Patent No. 191,787, dated June 12, 1877; application filed March 14, 1876.

*To all whom it may concern:*

Be it known that I, Mrs. ELIZA L. WHITON, of West Stafford, Tolland county, Connecticut, have invented a certain Compound, forming a Stove-Polish, of which the following is a specification:

This invention relates to that class of compounds used as a polish for stoves; and it consists in a composition formed by mixing graphite and gum-arabic in the following manner and proportions, to form a fine power to be used with water as a solvent, and to be applied and polished in the usual manner, by friction of brush or cloth.

Finely-pulverized graphite is mixed with finely-pulverized gum-arabic in the proportion of four (4) parts of the former to one (1) of the latter. These substances, when thoroughly incorporated one with the other, may be confined in a box, exposing, when the cover is removed, sufficient surface to permit a wet brush or rag to take off the powder, or the composition may be made, by the addition of water, into a paste having the desired consistency before being applied by the brushes.

I do not wish to claim the exclusive use of either of these ingredients in stove-polish, as I am aware that one or the other of them may have been combined with other ingredients for the same purpose; but, by combining the two in substantially the proportions before mentioned, I am able to form an admirable polish, that may be easily and quickly applied and quickly dried, to present a highly-polished surface, and one that leaves no residuum in the form of dust to fly from the stove or come off it upon contact.

And now, having described my invention, what I claim is—

A stove-polish, consisting of gum-arabic and graphite united to form a powder, and in the proportions substantially as set forth.

ELIZA L. WHITON. [L. S.]

Witnesses:
R. D. DAVISON,
JOS. MC. LAUGHLIN.